United States Patent [19]

Janzen

[11] Patent Number: 4,953,691
[45] Date of Patent: Sep. 4, 1990

[54] CONVEYOR CHAIN AND ATTACHMENTS THEREFOR

[75] Inventor: Wolfgang Janzen, Wilndorf-Obersdorf, Fed. Rep. of Germany

[73] Assignee: Flexon Holland, B.V., Amsterdam, Netherlands

[21] Appl. No.: 222,766

[22] Filed: Jul. 22, 1988

[30] Foreign Application Priority Data

Jul. 23, 1987 [DE] Fed. Rep. of Germany ....... 3724354

[51] Int. Cl.⁵ .............................................. B65G 17/14
[52] U.S. Cl. .................................. 198/803.01; 198/851
[58] Field of Search .................... 198/803.01, 851, 853, 198/845, 841, 840, 838

[56] References Cited

U.S. PATENT DOCUMENTS

| | | | |
|---|---|---|---|
| 2,954,113 | 9/1960 | Hibbard et al. | 198/851 X |
| 3,669,247 | 6/1972 | Pulver | 198/840 X |
| 3,765,458 | 10/1973 | Ziegler et al. | 198/803.01 |
| 3,842,968 | 10/1974 | Owens | 198/851 |
| 4,096,943 | 6/1978 | Gentsch | 198/851 X |

FOREIGN PATENT DOCUMENTS

| | | | |
|---|---|---|---|
| 0609683 | 6/1978 | U.S.S.R. | 198/803.01 |
| 1046165 | 10/1983 | U.S.S.R. | 198/803.01 |
| 1049372 | 10/1983 | U.S.S.R. | 198/803.01 |

*Primary Examiner*—David A. Bucci
*Assistant Examiner*—D. Glenn Dayoan
*Attorney, Agent, or Firm*—Robert A. Brown

[57] ABSTRACT

A roller chain conveyor including detachable, snap-on, top-plate assemblies having spaced apart, guide plate members adaptable to overlap the outer ends of connecting pins, so as to avoid contact thereof with laterally disposed guide tracks, especially during operation of the conveyor along curvilinear paths of travel in which transverse forces act on the roller chain. The absorption of the transverse forces occurs over guide plates that overlap the roller chain conveyor. The assemblies include a plurality of resilient, spring-like tongue members disposed about each guide plate member, the tongue members having recesses formed therein to receive in holding engagement a portion of the circumferential surface of each of the connecting pins. This arrangement, whereby there is provided a distinct, rigid, separate guide plate member and a resilient spring-like tongue member, provides a simple device for attachment and removal of the snap-on top plate assemblies to and from the roller chain.

14 Claims, 3 Drawing Sheets

CONVEYOR CHAIN AND ATTACHMENTS THEREFOR

BACKGROUND OF THE INVENTION

The present invention relates generally to an endless conveyor system and more particularly to a roller chain conveyor assembly including detachable, snap-on, top plate members in which the top plate members are provided on their underside with two downwardly extending guide plate members that laterally overlap the side bars of the links of the roller chain

DESCRIPTION OF THE PRIOR ART

A roller chain conveyor of the type designated at the outset is known from U.S. Pat. No. 3,708,059 to Ackerman. The use of such a conveyor chain along a curved-course path supporting the top plate assemblies of the conveyor has the disadvantage, however, that when the conveyor engages a region of curvature, the protruding, outboard ends of the chain bolts or connecting pins abut against the lateral guide tracks. Since the connecting pin ends are sharp-edged, this leads either to a considerable wear on the engagement surface concerned or else there must be provided in this region additional protective elements that assure a free non-contact passage of the chain bolt ends. This leads, however, to a higher construction expenditure for the guide tracks and, in the second place, there is present the danger of an increased wear in this zone, since by reason of the laterally open U-profile to be provided, the surface pressures in the contact zone between the guide plates and the roller chain side plates are correspondingly high.

In order to avoid this disadvantage, in U.S. Pat. No. 4,096,943 to Gentsch, it has been proposed to construct the guide plates out of two parts, one lying over and about the other, the inner part or saddle covering the transverse bores for the ends of the chain bolts and the outer part or saddle covering the transverse bores. In this manner, there is obtained a guide plate having an uninterrupted smooth surface on its outside, over which the conveyor chain under the influence of transverse forces, especially, however, also in curved regions can be supported on the lateral guide tracks and thereby there is assured a better, wear-free sliding arrangement. The top plates of such a conveying chain are subject, however, to more wear than the roller chain itself and must, therefore, be changed from time to time This type of known conveyor chain has the drawback that for the exchanging or replacement and, indeed, both for the removal or detaching and also for the mounting of a carrying top plate, a considerable expenditure of force is required, since the two superimposed parts of the inner and outer saddles have to be bent outwardly so that the chain bolt ends can come into position in the transverse bores of the inner part Since these operations have to be performed directly on the carrying plate conveyor, and in the individual case only a limited accessibility is given, the changing operation presents considerable difficulties.

In addition to the above illustrations of the prior art, the following references are pertinent to the subject matter of the present invention: 3,669,247; 3,513,964; 2,045,912; 3,842,968; 3,262,550; 3,512,627; and 2,954,113. However, none of the aforementioned patents succeeds in providing a solution to the problems of the prior art in the manner disclosed and claimed herein.

SUMMARY OF THE INVENTION

Accordingly, it is a primary obJect of the present invention to provide an improved roller chain conveyor assembly that includes a detachable, snap-on top plate member that is easily mounted on the roller chain and provides trouble free operation within the confines of the laterally disposed guide tracks.

Another obJect of the present invention is to provide an improved roller chain conveyor assembly that includes a detachable snap-on top plate member having spaced apart guide plate members disposed between resilient, spring-like tongue members having recess portions adaptable to receive connecting pins therein.

An additional object of the present invention is to provide an improved roller chain conveyor assembly that includes a detachable, snap-on top plate member having guide plate members spaced apart and containing therein a plurality of connecting pins so as to reduce frictional forces between the top plate member and guide tracks of the conveyor assembly.

A further obJect of the present invention is to provide an improved roller chain conveyor assembly that includes a detachable, snap-on top plate member having spaced apart, guide plate members disposed between resilient spring-like tongue members wherein lower portions thereof are bent outwardly to facilitate assembly and disassembly of the top plate member to and from the roller chain.

Another object of the present invention is to provide an improved roller chain conveyor assembly that includes a detachable, snap-on, top plate member, including a first component thereof formed from inelastic material and a second component thereof formed from elastic material.

An additional object of the present invention is to provide an improved roller chain conveyor assembly that includes a detachable, snap-on, top plate member that is easily removed from the roller chain by means of a tool adaptable to spread apart resilient, spring-like tongue members of the top plate member.

An improved roller chain conveyor assembly constructed in accordance with the present invention includes a detachable, snap-on, top plate member comprising base plate means, a plurality of guide plate means depending from said base plate means, resilient, spring-like tongue means depending from said base plate means disposed about said guide plate means, each of said tongue means having a recess formed therein at a side adJacent to an edge of said guide plate means, each recess of each of said tongue means being adaptable to receive therein connecting pins of said roller chain assembly, and portions of the ends of said pins being contained between the inner side surfaces of said guide plate means.

BRIEF DESCRIPTION OF THE DRAWING

The foregoing and other characteristics, objects, features and advantages of the present invention will become more apparent upon consideration of the following detailed description having reference to the accompanying figures of the drawing, wherein.

DESCRIPTION OF A PREFERRED EMBODIMENT

Figure 1:
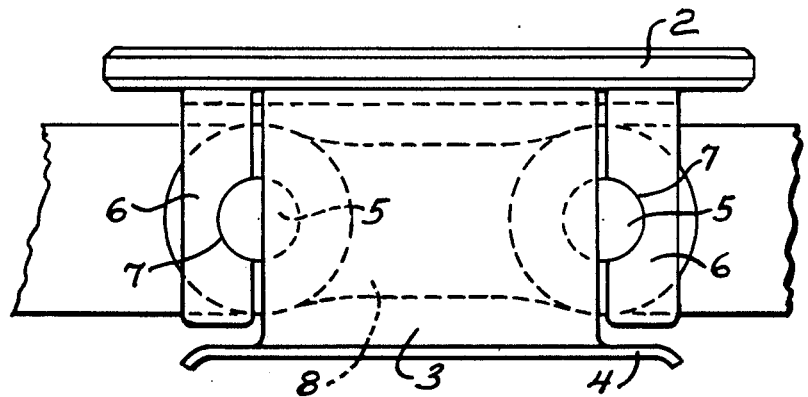
FIG. 1 is a side elevational view of a roller chain with a superimposed snap-on, top carryiny plate member.

Underlying the invention is the problem of making an attachment for conveying chain of the type designated which is simpler to mount, but simultaneously assures a trouble free operation within the laterally disposed guide tracks.

This problem is solved according to the invention by the means that the clear spacing between the two guide plates is at least equal to the length of the chain bolts that resilient spring tongue members connected with the carrying top plate are provided which in each case lie against the chain plate and which are provided with at least one recess which in each case embraces at least partly the free end of a chain bolt or connecting pin on its outer circumference, the spring tongues not being covered by the guide plates. This has the advantage that possible lateral forces from the guide plates acting on the conveying chain can be absorbed without its being possible for the free ends of the chain bolts to come into engagement on the corresponding surfaces of the guide tracks. Since the spring tongues, however, are not covered by the guide plates, these can be bent out freely in assembling and disassembling, so that for this a low expenditure of force is required, and, in particular, it is avoided that in the assembling also the guide plates are deformed and thus there is avoided any lateral jamming of the respective carrying top plates between the side surfaces of the guide tracks. Through the recesses in the spring tongues there occur, however, a secure clamping of the carrying plates both longitudinally and also transversely to the roller chain.

In a development of the invention it is provided that—as seen in the direction of travel of the roller chain—on both sides of each guide plate there is arranged in each case a spring tongue member. This arrangement has the advantage that with the dimensional length provided by the spacing between each two chain bolts the guide plates fit within the distance between each two chain bolts and thereby the ability to traverse curved paths is improved and, in the second place, the material cross section or thickness of the spring tongues to be bent out for the assembling is correspondingly reduced, so that with like strength the spreading forces required for assembling and disassembling are correspondingly reduced.

In further development of the invention it is provided that the spring tongue is always bent outwardly somewhat at its free end. Accordingly, in the assembling of the unit on the roller chain, the fitting or the threading is facilitated and by way of a wedge effect, the pressing force in the assembling is reduced.

In further development of the invention it is provided that the spring tongue has on its free end in each case an outward-facing, approximately channel-shaped curvature, whose width corresponds approximately to the depth of the recess at the apex height thereof embracing the chain bolt end. The assembling operation is hereby additionally facilitated.

In further development of the invention it is provided that the guide plates and the spring tongues are connected with one another is one piece over a plate joined with the carrying plate. This arrangement makes it possible to manufacture guide plates and spring tongues as a one-part component expediently in a stamping and bending operation from a section cut out of a sheet metal plate. Thereby there is present the possibility in the case of metal carrying plates and metal shaped parts to join both parts, instead of with rivets—which is necessary in the case of multilayer shaped parts—by a spot welding operation. Hereby the production of such carrying plate elements is simplified.

In further development of the invention it is provided that the bending in each case of the guide plates and of the allocated spring tongues is coaxially aligned and that the spring tongues run pre-curved against the roller chain side plates and that the apex of the curvature is arranged substantially in the region of the recess. Hereby there is achieved in conjunction with the available free spring length of the spring tongues a positive attachment or faultless fixing of the carrying plates on the roller chain. It is advantageous for the spring tongue members to extend beyond the bending radius into the region of the plate joining them with the guide plates. Hereby there is yielded a clear separation between the elastic range of the spring tongue and the rigid zone of the guide plate.

In another development of the invention it is provided that the guide plates are joined with one another over a connecting crosspiece member to form a first, substantially U-shaped component. Further, the spring tongues are joined to one another by a base plate to form a second molded part. The guide plate members joined by the crosspiece is disposed over and about the base plate joining the tongue members and both are solidly joined with the carrying plate. This arrangement has the advantage that for both of the shaped parts in correspondence with their applications, there can be selected different material thicknesses and material qualities. Thus, for the first shaped part forming the guide plates there may be used an inelastic material in suitable thickness, so that in this instance great transverse forces can be absorbed; while for the second shaped part forming the spring tongues there can be selected a material with good elastic properties and correspondingly less material strength, so that with the resilient spreadability of the spring tongue fundamental to this type of construction there is assured a simple assembling and disassembling.

In the chain of the invention the laterally projecting supporting webs gripping under the guide tracks of the conveyor can be formed as in the prior known conveying chains by the laterally bent-over free ends of the guide plates. In the conveying chain of the invention it is possible, however, by reason of the free elasticity of the spring tongues with respect to the guide plates to form the supporting webs by a lateral bending over of the free ends of the spring tongues. This makes it possible, especially in modes of operation using four spring tongues per carrying plate, to execute the spreading process in the disassembling by a simple tool applied to the supporting webs, since each supporting web connects two spring tongues on one side, all of the spring tongues can be spread open simultaneously.

DESCRIPTION OF A PREFERRED EMBODIMENT

Figure 4:
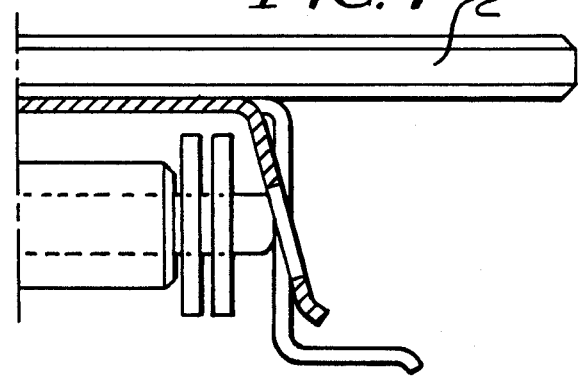
FIG. 4 is a frontal elevational view of a partial section transverse to the direction of travel of the roller chain including emplacement of the carrying plate.
Figure 5:
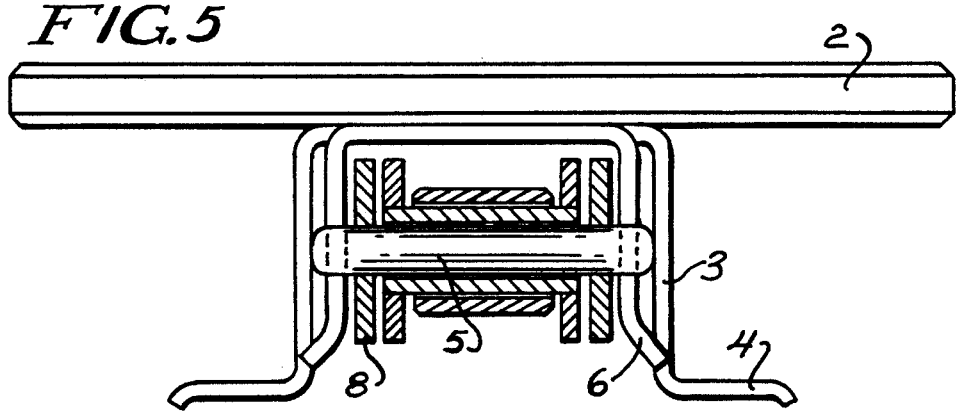
FIG. 5 is a frontal elevational view according to FIG. 4 showing in section the associative relationship among the structural members of the present invention.

The conveyor chain represented in FIG. 1 in a partial section shows a roller chain generally indicated by reference numeral 1 along with other roller chain links to which there is detachably Joined in each case a carrying top plate 2. The carrying plate 2 is provided on its underside with two guide plates 3 laterally overlapping the chain link members of the roller chain 1, and the guide plates 3 in each case has a respective free lower end bent outwardly to form a supporting web 4. As FIGS. 4 and 5 show, the clear spacing between the two guide plates 3 is at least equal to the length of the chain bolts or connecting pins 5 of the roller chain.

Figure 2:
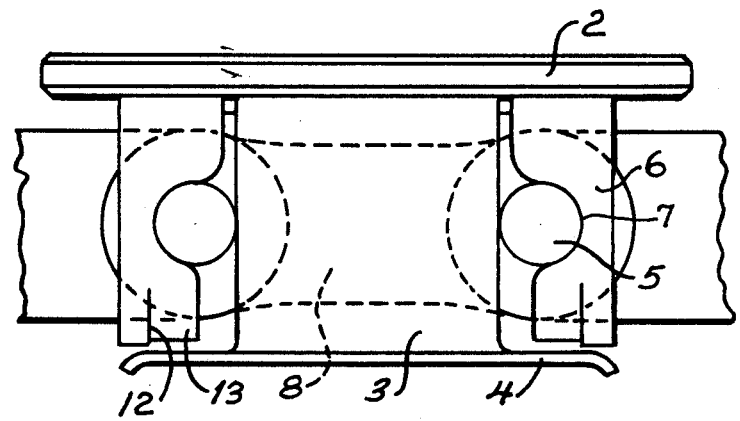
FIG. 2 is a side elevational view corresponding to FIG. 1 showing an improved structural arrangement for the guide plate member.

In addition to the two guide plates 3 arranged on each side of a roller chain member there are provided additional resilient spring tongue members 6 which are likewise joined with the carrying plate 2 and which are provided in each case with recesses 7 which at least partially embrace and receive an outer free end of a respective chain bolt 5 on its outer circumferential surface. The spring tongues 6 in each case resiliently contact on the outer side plates 8 of the roller chain. As shown in the side elevational view according to FIG. 1, the spring tongues 6 disposed on either side of and are not covered by the guide plates 3, so that, as shown in the face view according to FIG. 4, in fitting or sliding the unit onto the roller chain, the tongue members 6 can be bent out freely; i.e., unhampered by the guide plates 3. The guide plates 3, as represented in FIG. 1 can either cover partially the outer face ends of the chain bolt or else be dimensioned in their width in such a way that, as FIG. 2 shows, they permit the end face surfaces of the chain bolts entirely free or uncovered. In the mode of operation according to FIG. 2 there is shown the possibility of making the upper end of the spring tongue 6 wider than the free end of the spring tongue, so that a greater structural rigidity is accomplished during longitudinal direction of travel of the roller chain.

Figure 3:
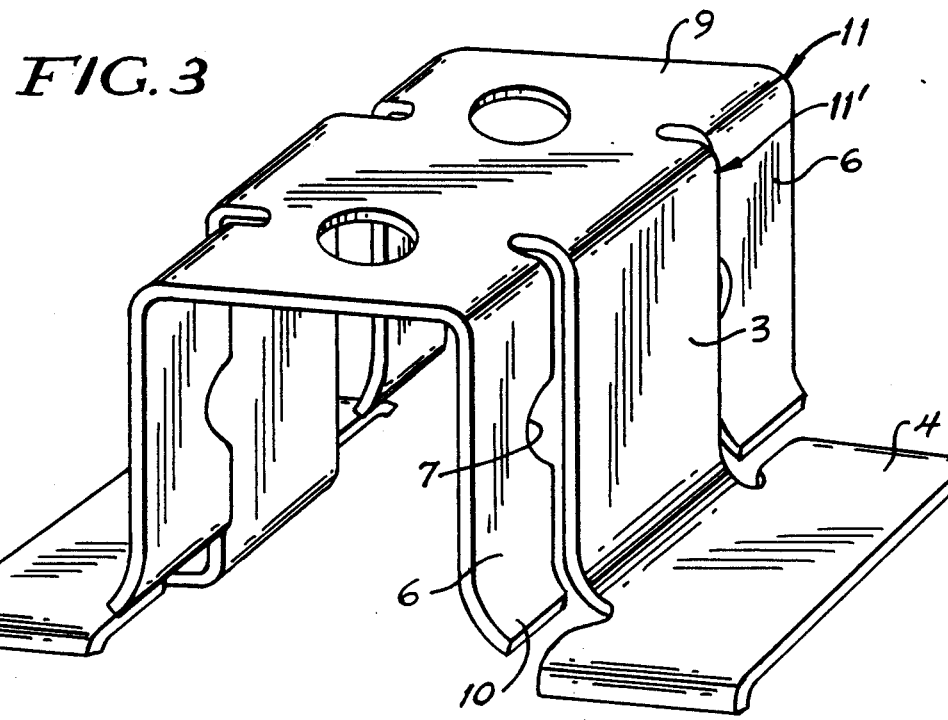
FIG. 3 is a perspective view of an improved snap-on member of the invention showing a single, one-piece device having on either side a guide plate disposed between two resilient, spring-like tongue members, but without a top carrying plate member.

In FIG. 3 there is represented in perspective and on a larger scale a shaped part which is made in one piece, for example, in a stamping and bending operation as cut from a sheet metal plate. The part may be Joined by riveting, preferably however by spot welding, to a carrying plate 2. From the perspective view there is also to be recognized the geometric apportionment or association between a guide plate 3 and a supporting web 4. The guide plates 3 and the spring tongues 6 are here joined with one another over and along a base plate member 9. The lower, depending free ends 10 of the spring tongues 6 are resilient and adaptable to be easily bent outwardly, in order thus to facilitate fitting or "threading" the part onto the roller chain. The bending radius 11 and 11' in the transition between the plate 9 and the spring tongues 6 and the guide plates 3, respectively, is about equally great. The stamping cut subdividing the spring tongues 6 from a guide plate 3 is here made in a manner that it extends from its point of separation at the lower ends 10 upwardly, overly and around the bending radius 11 onward; and into the flat surface of plate 9, so that a trouble free separation, without stress, is provided between guide plates 3 and spring tongue 6.

Figure 6:
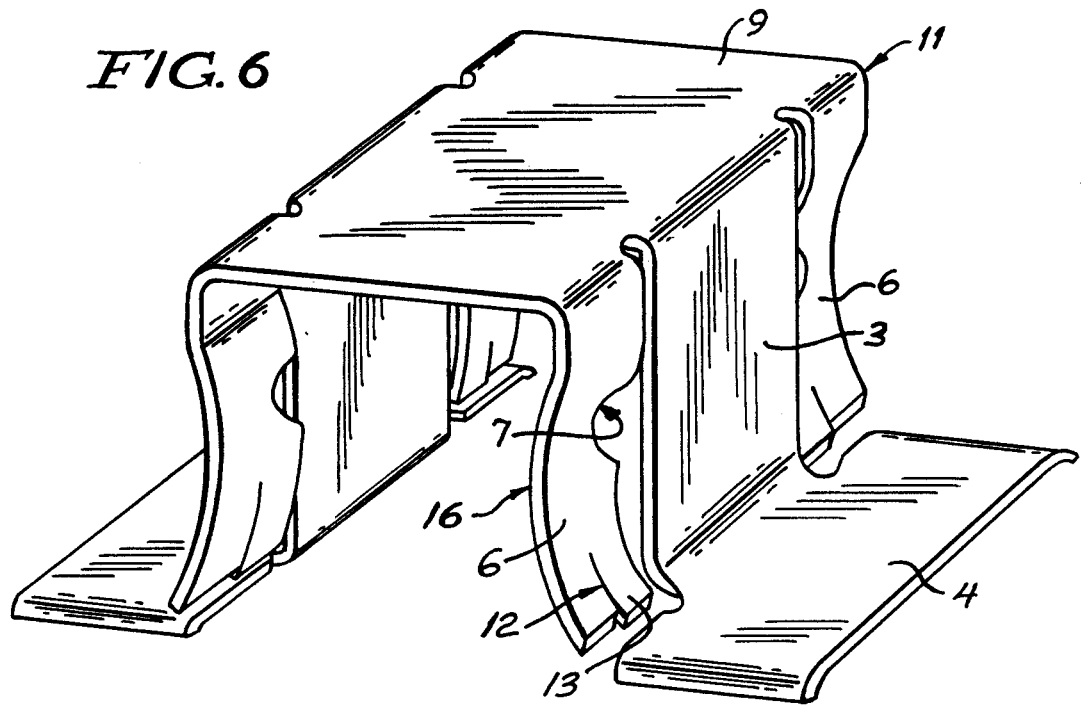
FIG. 6 is a perspective view of a modified embodiment of the invention showing a one-piece shaped member having guide plates and resilient spring tongue members including lower portions thereof split and curved outwardly.

FIG. 6 shows in a perspective view similar to FIG. 3 a mode of operation for a shaped part such as is represented in a side view in FIG. 2. In this shaped part, which again is produced in one piece from a sheet metal plate by a stamping and bending operation, the guide plate 3 and the spring tongues 6 are joined with one another over a plate 9, after which they may be joined again by riveting or spot welding with the carrying plate (here not represented in detail). In the shaped part represented in FIG. 6, in variation from the shaped part according to FIG. 3, the bending radius 11, both of the guide plates 3 and also of the spring tongues 6, is coaxial or co-extensive along the length of the plate 9, so that the plate 9 presents the same width over its entire length. The spring tongues 6 are here curved inwardly, the apex 16 of the curvature lying about in the zone of the recess 7. The free end of the spring tongues is then directed outwardly here in correspondence to the generation of curvature. By an additional stamping cut 12 running in a lengthwise direction of the spring tongues there is here formed an outwardly-facing curved surface 13, the width of which corresponds substantially to the depth or length of the recess 7 taken along the apex 16 and in turn embraces the chain bolt end. Hereby there is provided a faultless centering when the carrying plate provided with the shaped part is pressed onto the roller chain.

Figure 7:
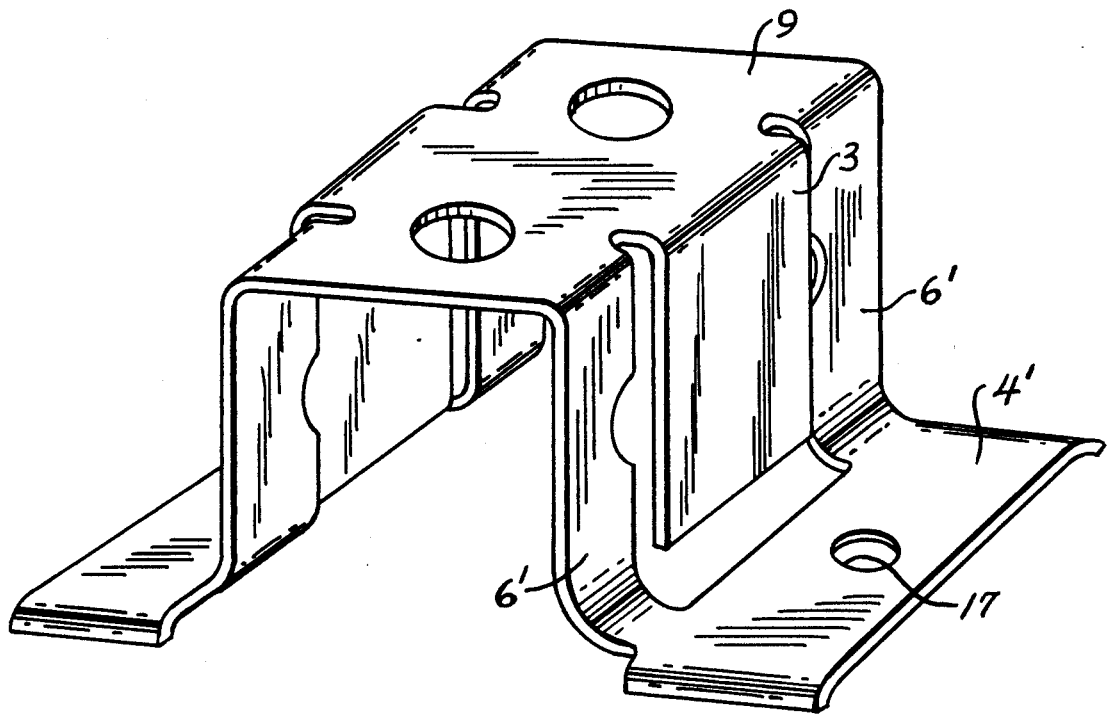
FIG. 7 is a perspective view of another form of embodiment of the invention showing a one-piece shaped member.

In FIG. 7 there is represented a mode of operation in which spring tongues 6' are joined with one another at their free ends by an outward-bent supporting web 4'. The guide plates 3 are extended here rectilinearly downwardly. In the supporting webs 4') there can be arranged a bore 17 for receiving a tool member, so that for the disassembling operation there can be applied a tool member, such as spreading tongs, by which all four spring tongues are spread open simultaneously and the carrying plate assembly concerned can be lifted from the roller chain. FIG. 7 makes it evident, further, that with a corresponding alteration of the dimensions transversely to the direction of travel of the roller chain, the function of the spring tongues on the one hand and guide plates on the other hand can be interchanged. Thus it is possible, for example, to dimension the elements, provided with the reference numeral 6' and solidly Joined with one another over the supporting web 4' in their with in such a way that the clear spacing corresponds at least to the length of the chain bolt, while the element provided with the reference number 3 is constructed as a spring tongue and provided with recesses on both side edges, which grip about the outer circumference of two adJacent chain bolts. By a corresponding outer curvature toward the chain plate there is yielded, accordingly, the opening for the fitting or "threading" onto the roll chain.

Figure 8:
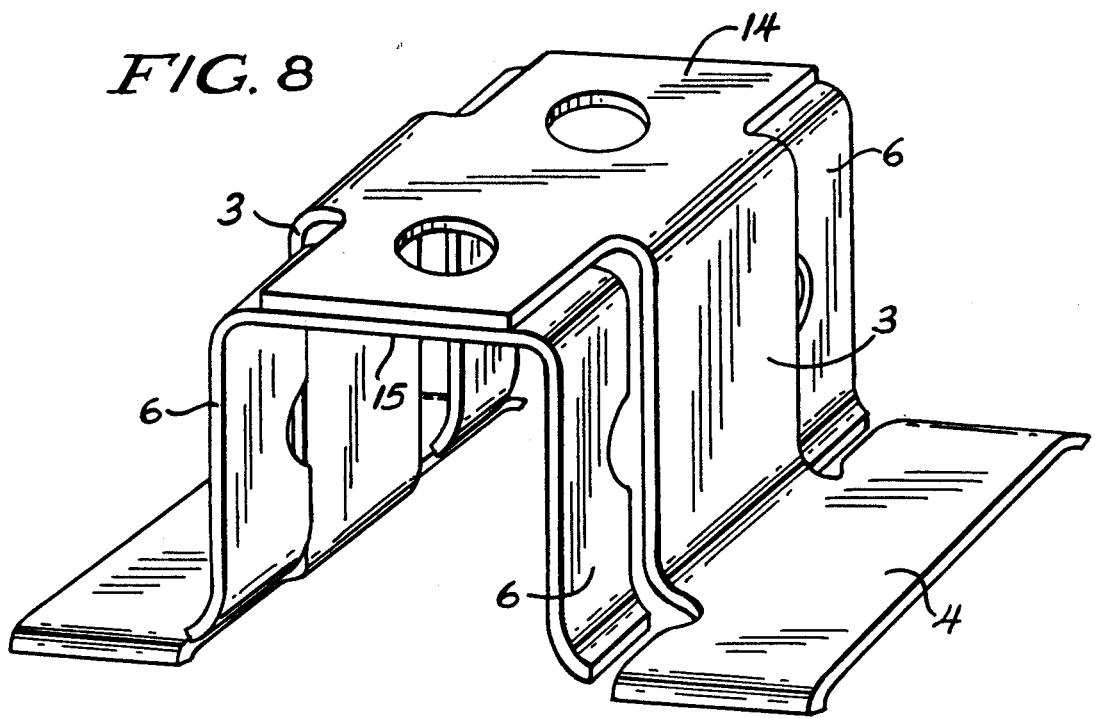
FIG. 8 is a perspective view of further embodiment of the invention showing a first integral member having guide plates and a second integral part member having resilient spring tongue members.

In FIG. 8 there is represented a modified, two-part construction. The structure corresponds in its manner of functioning to the embodiment described with the aid of FIG. 3. The difference here lies merely in that the guide plates 3 with a transverse web or crossbar means 14 form a first shaped part, which is produced in stamping and bending a part cut from a thicker or more rigid material and a second shaped part that presents a continuous base plate means 15, from which the spring tongues 6 are dependingly joined. These shaped parts are fitted together and securely joined thereto over the web and the base plate, for example, by riveting, or other suitable means to an appropriate carrying plate 2. The second shaped part carrying the spring tongues 6 is in this instance stamped out of a material that is selected with respect to its elastic properties.

While the invention has been described with reference to a preferred embodiment, it will be understood by those skilled in the art that various changes may be made and equivalents may be substituted for elements thereof without departing from the scope of the invention In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A roller chain conveyor and a detachable top plate assembly therefor, said top plate assembly comprising
    top plate base member means,
    a plurality of guide plate means, each depending from opposite sides of said base member means so as to overlap roller links of said chain conveyor, the lateral distance between said guide plate means being at least equal to the overall length of connecting pins of said roller links,
    at least four resilient spring-like tongue member means, each depending from said opposite sides of said base member means disposed about and separated by a vertical space from each of said guide plate means, each said tongue member means having yieldable contact with side bars of said roller links,
    recess means formed in each of said tongue member means, first and second pairs of said recess means having a coincident transverse axis and being adaptable to receive and maintain therein a one of said connecting pins, and
    top plate carrying means secured to said top plate base member means.

2. A roller chain conveyor as claimed in claim 1 wherein each of said guide plate means is disposed between said plurality of spring-like tongue member means.

3. A roller chain conveyor as claimed in claim 2 wherein each of said tongue member means has a lower portion bent outwardly to form a flared lower end.

4. A roller chain conveyor as claimed in claim 3 wherein each of said flared lower ends comprises an outwardly facing curved surface, said tongue member means being inwardly curved to form an apex adjacent to said recess means, said outwardly curved surface having a width substantially equal to a depth of said recess means as measured at said apex of said tongue member means.

5. A roller chain conveyor as claimed in claim 4 where said top plate base member means, said guide plate means and said tongue member means are integral with and formed from a single, one-piece unit of material.

6. A roller chain conveyor as claimed in claim 5 wherein said base member means, said guide plate means and said tongue member means are formed from said unit of material by a stamping and bending operation.

7. A roller chain conveyor as claimed in claim 6 wherein a bending radius disposed at a transition zone between said base member means and said guide plate means is substantially equal to a bending radius disposed at a transition zone between said base member means and said tongue member means.

8. A roller chain conveyor as claimed in claim 7 wherein the bending radius of the transition zone for each of the guide plate means and for each of the tongue member means is coaxially aligned, the tongue member means has a preselected curved surface abutting against the side plates of the roller links and an apex of curvature of the tongue member means is arranged substantially in the zone of the recess.

9. A roller chain conveyor as claimed in claim 8, wherein a point of separation between the spring tongue member means and the guide plate means extends upwardly over and around the bending radius into the zone of the base member means connecting it with the guide plate means.

10. A roller chain conveyor as claimed in claim 1 wherein at least two of said spring tongue member means disposed on each side of the roller chain are joined at their free ends by a laterally bent-over supporting web aligned in the direction of travel of the roller chain.

11. A roller chain conveyor as claimed in claim 10 wherein the supporting webs have formed therein means for receiving a tool so as to facilitate removal of said top plate assembly from the roller chain conveyor.

12. A roller chain conveyor and a detachable top plate assembly therefor, said top plate assembly comprising
    a plurality of guide plate means, each depending from opposite sides of transverse web means to form a first substantially U-shaped member so as to overlap roller links of said chain conveyor, the lateral distance between said guide plate means being at least equal to the overall length of connecting pins of said roller links,
    a plurality of resilient tongue member means depending from opposite sides of a continuous base plate means to form a second substantially U-shaped member, each said tongue member means having yieldable contact with side bars of said roller links,
    said first U-shaped member being adaptable to overlie and contact said second U-shaped member,
    concave recess means formed in each of said tongue member means, a plurality of said concave recess means having a coincident transverse axis and adaptable to receive and maintain therein a one of said connecting pins, and
    a top plate carrying means for attachment at an upper side of said first U-shaped member and having securing means for fixedly connecting together said first and second U-shaped members.

13. A roller chain conveyor as claimed in claim 12, wherein the first formed U-shaped member including the guide plate means comprises a material having a high resistance to bending and the second formed U- shaped member including the resilient tongue member means comprises an elastic material.

14. A detachable top plate assembly for a roller chain conveyor comprising
top plate base member means,
a plurality of guide plate means, each depending from opposite sides of said base member means so as to overlap roller links of said chain conveyor, the lateral distance between said guide plate means being at least equal to the overall length of connecting pins of said roller links,
at least four resilient spring-like tongue member means each depending from said opposite sides of said base member means disposed about and separated by a vertical space from each of said guide plate means, each said tongue member means having yieldable contact with side bars of said roller links,
recess means formed in each said tongue member means, first and second pairs of said recess means having a coincident transverse axis and being adaptable to receive and maintain therein a one of said connecting pins, and
top plate carrying means secured to said top plate base member means.

* * * * *